March 6, 1956  R. W. DOWLING  2,737,083
PICTURE-PROJECTION SYSTEM FOR PROJECTING MOVING PICTURES
Filed Feb. 2, 1955  4 Sheets-Sheet 1
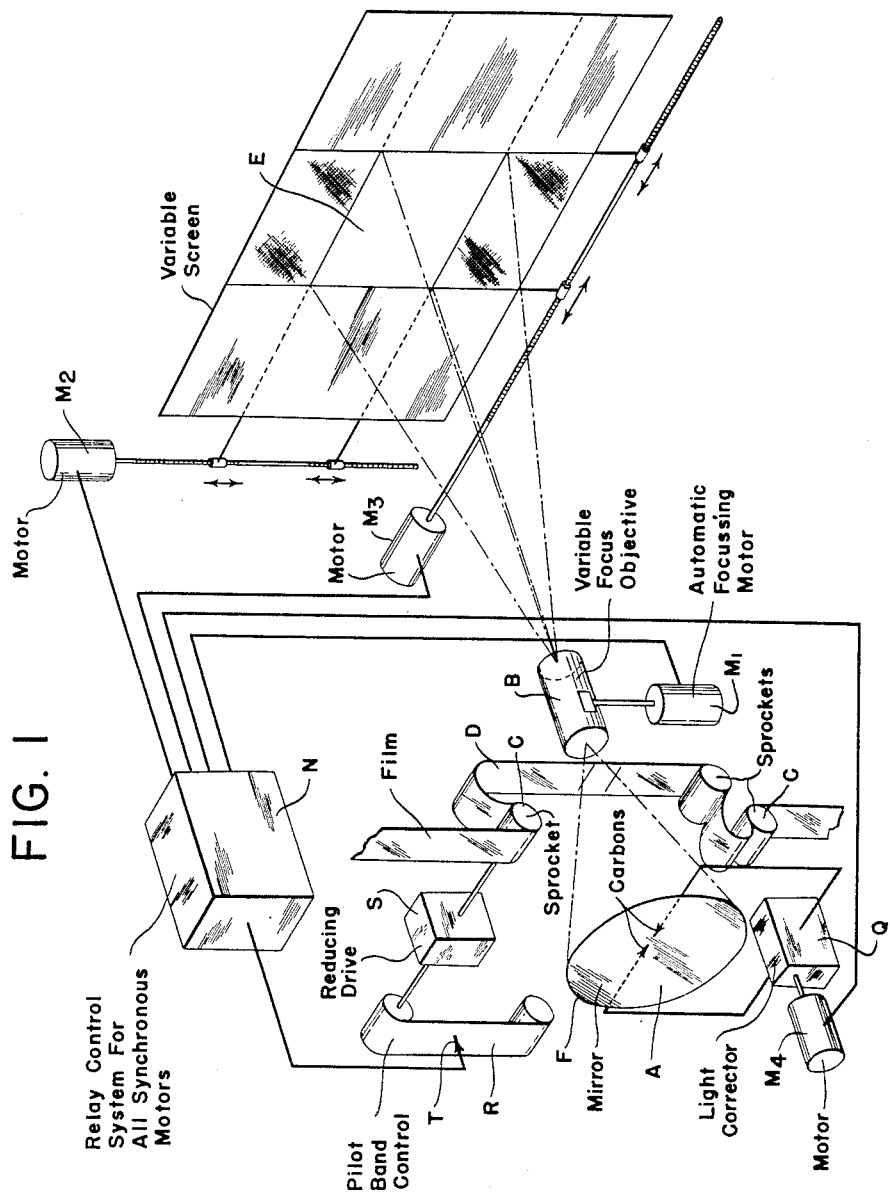
FIG. I
INVENTOR.
Robert Whittle Dowling
BY
ATTORNEYS March 6, 1956  R. W. DOWLING  2,737,083
PICTURE-PROJECTION SYSTEM FOR PROJECTING MOVING PICTURES
Filed Feb. 2, 1955  4 Sheets-Sheet 2
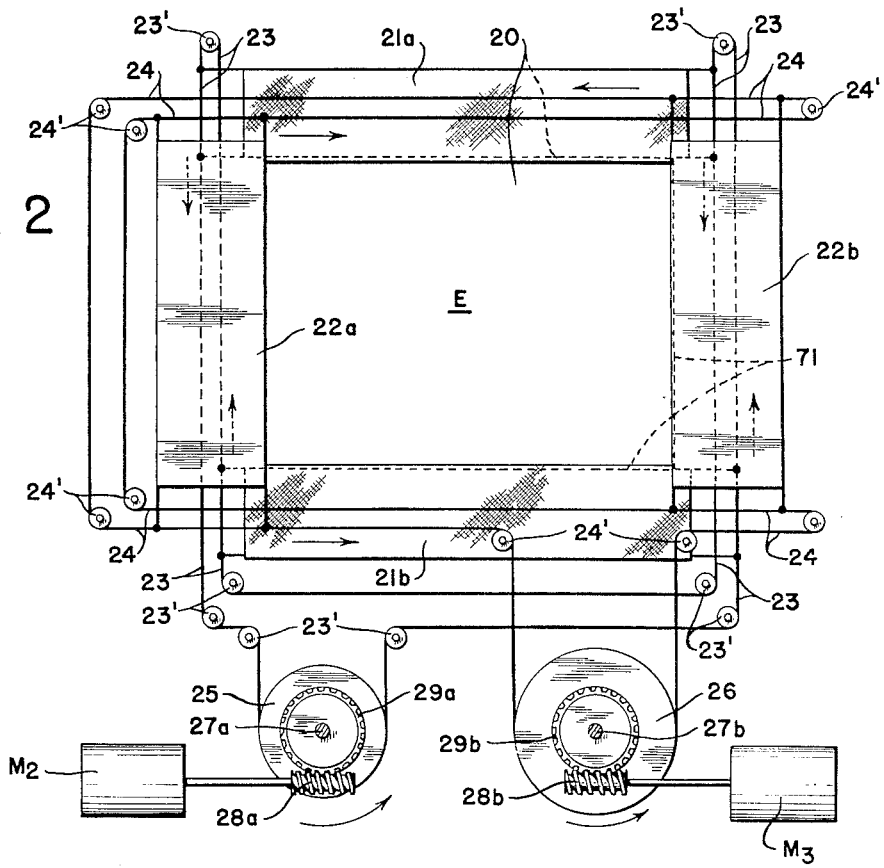
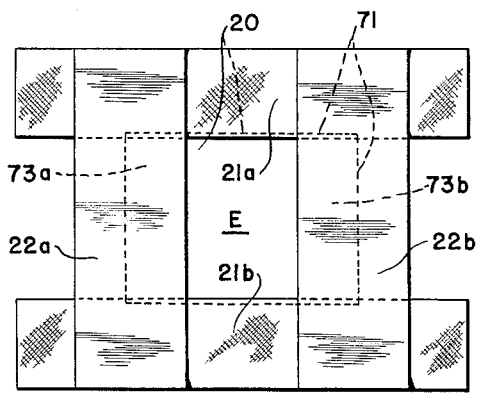
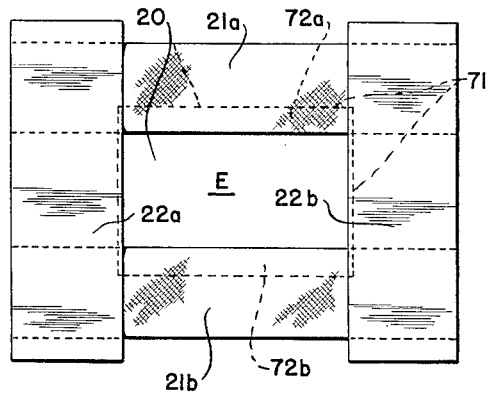
*INVENTOR.*
Robert Whittle Dowling
BY
ATTORNEYS March 6, 1956 R. W. DOWLING 2,737,083
PICTURE-PROJECTION SYSTEM FOR PROJECTING MOVING PICTURES
Filed Feb. 2, 1955 4 Sheets-Sheet 3

INVENTOR.
Robert Whittle Dowling
BY
ATTORNEYS

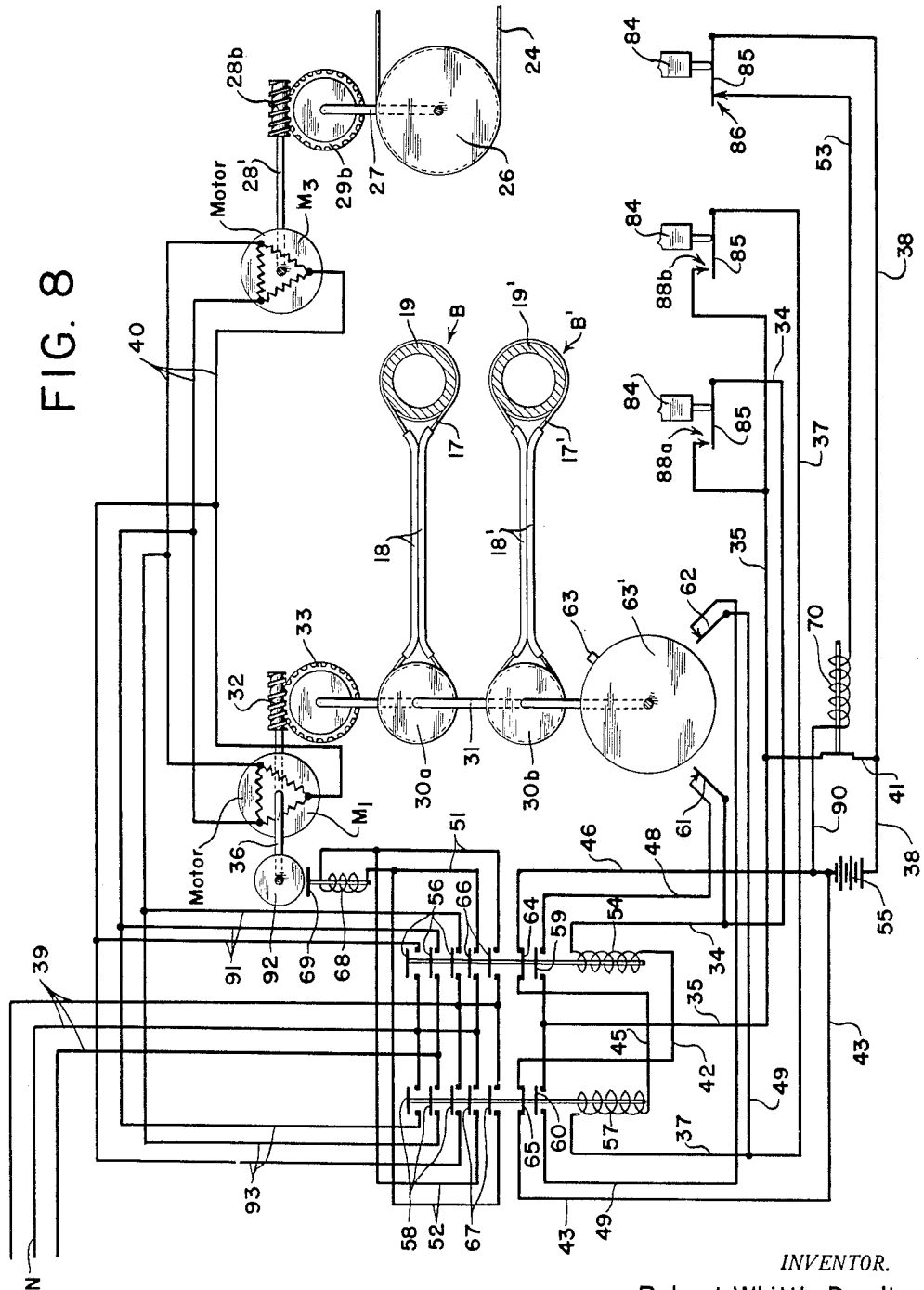

United States Patent Office 2,737,083
Patented Mar. 6, 1956

2,737,083
PICTURE-PROJECTION SYSTEM FOR PROJECTING MOVING PICTURES

Robert W. Dowling, New York, N. Y.

Application February 2, 1955, Serial No. 485,752

Claims priority, application France March 16, 1954

10 Claims. (Cl. 88—24)

The invention relates to improvements in motion-picture projection installations, which improvements are additional to those which had been provided for them by my pending U. S. application, Serial No. 407,719, filed February 2, 1954, of which this application is a continuation-in-part.

The improvements disclosed in that application comprised installations of the kind in question means suitable for varying during the projection of the film the useful dimensions of the screen as well as the dimensions of the pictures projected on the latter, for example, by acting on the focal length of the projection objective while, naturally, maintaining the focus on the screen.

In the pending application it had been suggested to vary the useful dimensions of the screen by forming its frame or border by masks capable of being displaced parallel to the edges of the screen in such a way that the surface circumscribed by said masks on the screen has dimensions identical to those of the projected picture.

However, during subsequent tests, it has been found that, by making use of masks or border-forming means of a dark and dull material, such as black velvet, it was possible to project the picture very nicely beyond the surface surrounded by the masks, while giving to the observers the illusion that the picture was projected only within the free space circumscribed by the masks, i. e., because of the absorption of the light by the masks.

The principal object of the present invention is to provide improvements in portions of the installation disclosed in my French and U. S. applications, the latter corresponding to my French application No. 653,626, filed August 27, 1953.

The improvements according to the inventions, comprise particularly in so arranging the installations of the kind in question that they correspond to the essential characteristics, referred to above, of varying the useful dimensions of the screen by forming its frame or border by masks capable of being displaced parallel to the edges of the screen, said masks being displaceable in synchronism with changes in the dimensions of the pictures projected onto the screen to change the relative height-to-width dimensions of the picture area of the screen to correspond with those of the projected pictures.

Besides this arrangement, the present invention is comprised of certain other arrangements which are used preferably at the same time but which, if necessary, may be used separately and which will be discussed hereafter in greater detail.

The second arrangement is comprised of controlling the different operations of the projection, particularly those for varying the dimensions of the pictures and of the useful screen area, by a control strip or piece of cardboard displaced intermittently at suitable moments of the projection, this strip carrying marks or signals capable of releasing or effecting the said operations, while the displacements of the control strip or piece of cardboard are advantageously controlled by a pilot strip (or by the film) itself carrying a single series of appropriate marks or signals and being unwound in synchronism with the film.

The third arrangement is comprises of providing for the installations of the kind in question at least two projection devices or projectors which are to be used alternately during the projection, as well as means capable of controlling automatically, in synchronism with the unwinding of the film, the various operations of the projection, for instance, those which tend to change the dimensions of the pictures and of the screen, and means for controlling by said means the reversing operations of the projectors during the projection of the film.

The invention concerns more particularly a certain mode of application, as well as certain modes of realization, of the above-mentioned arrangements, and it concerns still more particularly, i. e., as new industrial products, the installations of the kind in question comprising the application of these arrangements, as well as the special elements necessary for setting them up.

The invention will be well understood by means of the additional description which follows, in connection with the attached drawings, which additional description and drawings are given especially by way of example.

Fig. 1 represents schematically and diagrammatically an installation for the projection of pictures according to the invention;

Fig. 2 is an elevational diagrammatic view of the variable screen shown in Fig. 1, and the masking means, together with its driving or operating mechanism;

Figs. 3 and 4 are diagrammatic views on a smaller scale showing two different positions of operation of the screen and masking means shown in Fig. 2;

Fig. 8 is a diagrammatic view which represents schematically the control system and electrical wiring arrangement of the installation shown in Figs. 1, 5 and 6.

Figure 5:
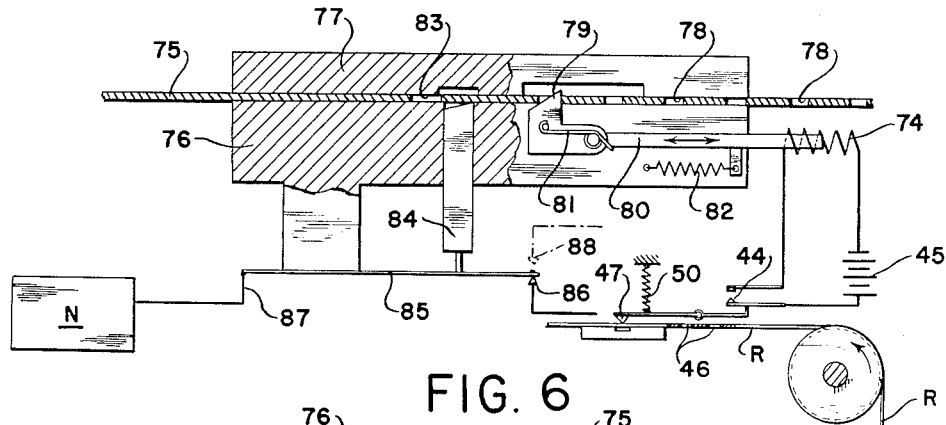
Figs. 5 and 6 are broken diagrammatic views, respectively in section along the line V—V of Fig. 6, and in plan, with portions cut away and removed, of the automatic control mechanism of the installation.

According to the invention and, more particularly, according to that of its modes of application, as well as according to those of the modes of realization of its various parts, to which, it seems, should be given preference, when starting to set up a motion-picture projection installation, one proceeds as follows or in a similar manner.

First of all, the installation proper in its entirety corresponds generally to that disclosed in said applications, for instance, as shown schematically in Fig. 1. In this figure, the elements comprise a source of light A, for example, a carbon arc lamp equipped with a mirror F as indicated, an objective B, a device or devices C suitable to pass a picture film D between the source of light A and the objective B, and a projection screen E located at a practically fixed position from the objective B.

According to the invention, there are added to the above elements means capable of changing continuously, during the projection of the film D, simultaneously and in coincidence, the useful dimensions of the screen, as well as the dimensions of the pictures projected on the latter, for example, means is provided for changing the focal length of the objective B so as to modify its enlargement, while, naturally, maintaining the focus on the screen. For this purpose, a control system N is provided, comprising an electrical relay system commanding all synchronous motors of the installation, which acts on a servomotor, shown schematically at $M_1$, which in turn acts on the optical system of the objective B, and one or more servomotors shown schematically at $M_2$ and $M_3$ capable of increasing or decreasing the useful height and width of the screen, while maintaining these dimensions in a practically fixed relation, the control system N being such that the picture projected and focused on the screen at any moment coincides with the useful zone or area of the screen both in position and dimensions. The center of the screen should preferably be fixed, but the invention does not exclude the provision of additional servomotors, likewise subjected to the control system N, in order correspondingly to change the inclination of the projector and the centering of the useful zone or area of the screen.

The installation advantageously includes means coupled to the control N for varying the luminous flux or intensity or brightness of the light projected onto the screen in such a way that the illumination of each picture appears practically constant regardless of the dimensions given to it on the screen. By way of example, these means are represented schematically by a servomotor M4, subjected to the control system N and acting on an apparatus Q capable of reducing the light intensity of the source A, when the dimensions of the picture on the screen are reduced and vice-versa.

The simultaneous variations in the dimensions of the screen and the picture should be effected at definite moments of the projection, because certain scenes must be projected in large dimensions, others in small dimensions, and again others in intermediate dimensions, depending on the program set up in advance, in order to give the best possible artistic effect.

For this purpose, it may be left to the operator to handle the control system N according to the particular program set up, but it is preferable and more advantageous to operate the control system N automatically in synchronism with the unwinding of the film. To this end, either the film D itself, or, preferably, an auxiliary or pilot strip R driven in synchronism with the film D through a speed-reducing gear S, carries marks or signals, which, when explored or picked up by a suitable sensing system T, are capable of connecting the control system N for operation of the various motors in the desired direction.

According to one mode of advantageous realization similar to that described in said application use is made of a white screen 20 (Fig. 2) of ordinary type, or, preferably, of high brightness, of dimensions at least equal to those of the largest picture to be projected. The masks are formed by strips of fabric suitable for framing the picture horizontally and vertically. The horizontal strips 21a and 21b can be displaced parallel to themselves, or with respect to each other, in either direction. The same thing applies to the vertical strips 22a and 22b.

For this purpose, as shown in Fig. 2, the pairs of horizontal and vertical strips are attached, preferably for reciprocal motion, respectively, to the appropriate strands of two endless cables 23 and 24, respectively arranged on sets of pulleys 23' and 24' and capable of being driven by the motors M2 and M3, for which purpose, for instance, the cables 23 and 24 are respectively passed over two pulleys 25 and 26 mounted on shafts 27a and 27b. The motors M2 and M3 drive the pulleys 25 and 26 respectively by means of worm gear reducers 28a and 28b respectively mesh with toothed wheels 29a and 29b fixed respectively to the shafts 27a and 27b. The worm gears 28a and 28b are respectively fixed to the shafts of the motors M2 and M3 which are controlled and activated from the central control system N shown in Fig. 1.

When the horizontal and vertical strips, as mentioned above, are formed of black velvet, or a similar material of dark color, the picture may freely pass beyond the inner edges of said strips without being noticed by the observers, for the black velvet absorbs the light sufficiently for the part of the picture received by this velvet to remain practically invisible.

If, for instance, there is available a film of normal size (height/width=¾), it is possible, according to the invention, either, as shown in Fig. 2, to give to the screen E a useful surface identical to that of the picture 71, indicated in dotted lines, or, as shown in Fig. 3, to reduce, with respect to that of the picture 71, the height/width ratio of the useful surface of the screen E by preferably equalizing the respective widths, thus giving to the observers the impression of a panoramic projection by the fact that the parts 72a and 72b of the picture which go beyond the inner edges of the strips 21a and 21b remain practically invisible, or, as shown in Fig. 4, to increase, with respect to that of the picture 71, the height/width ratio of the useful surface of the screen E by preferably equalizing the respective heights and thus giving to the observers the impression of a square or elongated projection in the direction of the height because the parts 73a and 73b of the picture which go beyond the inner edges of the strips 22a and 22b remain practically invisible.

Thus, during the projection of a standard film, the invention permits a change from the normal size to the panoramic size, even to the vertical centering (height surpassing the width), and inversely in order to obtain the best-possible artistic effect, depending on the kind of the projected scenes. In these operations the motors M2 and M3 are operated simultaneously or independently to give the desired size and shape to the screen area E.

Now, as regards maintaining the control of motors M1, M2, M3 and similar motors, all indications or signals or signal-producing means necessary for operating the masks or border forming means and the objective may be carried by the pilot strip R or by the film D.

Preferably, however, according to another arrangement of the invention, which may otherwise be used separately, there is connected to or associated with the pilot strip R a strip or cardboard carrying the signals or signal-producing means which have just been discussed, this control strip or cardboard being displaced intermittently by the effect of or in response to impulses caused by the pilot strip R, and being itself capable of releasing, initiating or controlling the said operations during this intermittent displacement.

Because of this arrangement the pilot strip R may carry only one line of marks or signals, and it can be very narrow. By way of a variant, this permits the pilot strip R to be combined with the film D by simply reserving or providing on the latter a track carrying signals or marks capable of releasing the control strip or cardboard for intermittent movements.

Figure 6:
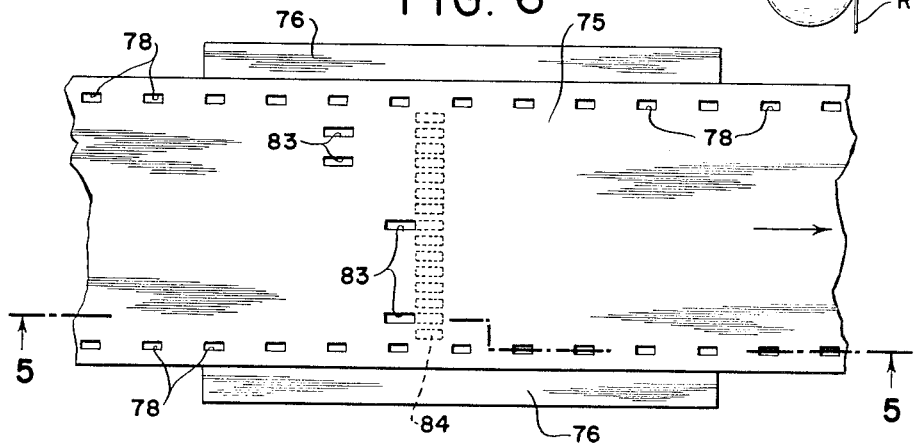

For this purpose, a mode of realization such as that shown in Figs. 5 and 6, is advantageously employed. In this arrangement the pilot strip R (or the film D) is passed in front of a feeling finger 47 biased toward the strip R by a spring 50. In this strip are provided holes or notches 46 which will be presented under the feeling finger 47 as the strip is moved. When a hole appears under this feeling finger 47 the latter sinks in and closes an electric control contact or switch 44, which is inserted in the feeding circuit of an electro-magnet 74, the current for which is provided by a battery 45, for example.

The control, strip, or cardboard 75, arranged between a slide 76 and a pressing device 77 carries at least one row of dragging holes 78, two rows being shown in Fig. 6. A dragging hook 79, arranged with respect to this, or each, row of holes, is pivoted on the armature 80 of the electro-magnet 74 and biased towards the strip 75 by a spring 81. A second spring 82 connected to the armature, is elastically opposed to the displacements of the armature 80 which are effected and determined by the electro-magnet 74. The course or throw of the armature 80 is slightly longer than the distance between two adjacent holes 78.

It will be seen that, each time the feeling finger 47 meets a hole 46 in the pilot strip R, the armature 80 is attracted and pulled by the electro-magnet 74, which causes the cardboard 75 to advance by a distance equal to that lying between two holes 78, whereupon the switch 44 is opened as the strip R moves on, the electromagnet is deenergized and the armature 80 with the hook 79 is pulled back by the spring 82 to engage the hook 79 in the next hole 78.

The card 75 carries, besides the holes 78, control holes or notches 83 which are arranged according to a certain number of rows (15 in the example shown in Fig. 6), each row corresponding, respectively, to one particular operation. The control notches or signals 83, wherever provided along the control card 75, are aligned transversely to the pulling notches 78. A feeling finger, pin or plunger 84, slidingly mounted in the slide 76 with respect to each row of notches 83, is biased towards the card 75 by an elastic spring strip 85 which forms the movable element of a contact piece or electric switch 86 connected in suitable manner by a wire 87 with one of the relays of the control system N. This contact piece or switch 86 can be of the normally closed type (as shown in full line in Fig. 5), to open and then close during the displacement of the card 75, or of the normally open type 88 (as shown by dash-and-dot line contact Fig. 5), to close and then open during the displacement of the card 75.

It will thus be seen that, if the control notches 83 are arranged carefully on the card 75, it is possible, by means of a single row of holes or signals on the pilot strip R (or on the film D), to control a number of operations of any kind, provided that the card 75 is given a sufficient width.

Incidentally, the contact device 44 may be actuated by the operator without the necessity in this case of providing a special pilot strip or a special row of notches or equivalent signals on the film.

With respect to the control system N, there is advantageously connected or included with it a relay for each of the following operations, it being understood that for each relay there is a contact device or switch such as 86 or 88:

A relay which makes the forward connections and a relay which makes the return or reverse connections, these relays being common to all motors and provided with contacts 88 of the normally open type;

Three relays for stopping respectively the motors $M_1$, $M_2$, and $M_3$ and equipped with contact devices 86 of the normally closed type and with end-of-stroke contactors mounted on each of these motors, these relays being capable of discontinuing the connections established by the preceding relays;

Four relays, for instance, each corresponding to a different speed of the group of motors $M_1$, $M_2$, and $M_3$ and preferably arranged so as mutually to exclude one another, these relays being equipped with contactors 88 of the normally open type, as well as a relay capable of neutralizing the relays of the speeds.

The relays which control the forward and backward movement and the speeds carry a holding contact destined to hold them in the state in which the impulse provided by the pilot has placed them up to the subsequent neutralization control.

The motors $M_1$, $M_2$ and $M_3$ consist of ordinary induction motors whose speed varies very little with the load, experience having shown that the synchronism of the movements obtained was sufficient for the requirements of the practice. The forward and backward movements are obtained by reversing the connections of the feeding conductors of these motors.

Interfering shifting occurs practically only at the moment of stopping, each motor having a tendency of continuing the movement on its march for a variable period of time depending on the inertia and the frictions of the mechanism. This drawback is eliminated by means of brakes which are applied to the shafts of the motors as soon as the contactors 86 operating the stop of the motors are closed and which are set free, when these contactors are opened.

The different speeds of the motors controlled by the relays mentioned above are obtained advantageously by varying the number of poles of the stator: several coils located in the slots of the latter, depending on the position of the corresponding relays, may give, for instance, 4, 6, 8 or 10 poles and corresponding speeds of 1500, 1000, 750 or 600 R. P. M., for a feeding current of 50 cycles, or speeds of 1800, 1200, 900 or 720 R. P. M., for a feeding current of 60 cycles.

The operation of the control system N is as follows: Assuming, for instance to project a number of pictures of panoramic size with the ratio height/width=2/3 over the greatest possible width of the screen, while the particular scene is of the smallest dimension and of the size of 3/4, the transition having to be carried out in third speed. One then proceeds in the following manner:

On the pilot strip R, a first notch provides a preparatory impulse which, while causing the control card 75 to pass by, leads in front of the appropriate finger 84 a notch 83 which produces the excitation of the corresponding relay at the third speed.

On the pilot strip R, a second notch produces a releasing impulse which, by causing the control card 75 to pass by, leads in front of the fingers 84 the notches 83 which cause the inactivation of the relays which keep the motors $M_1$, $M_2$ and $M_3$ stopped, which motors control the objective and the masks. The dimensions of the picture and those of the screen then increase simultaneously.

On the pilot strip R, a third notch produces a stopping impulse which, by causing the control card 75 to pass by, leads in front of the appropriate finger 84 the notch 83 which causes the reactivation of the relay which holds the motor $M_3$, commanding the horizontal masks, as well as the brake of this motor stopped. The height of the screen has reached its definite value. The dimensions of the picture and the width of the screen continue to increase. The end-of-stroke contacts, finally, cause the reactivation of the relays which hold the motors $M_1$ and $M_2$, which control, respectively, the objective and the vertical masks, as well as the brake of these motors stopped. The dimensions of the picture and the width of the screen have reached their definitive values, in the occurrence of the maximum values.

On the pilot strip R, a fourth notch, finally, produces an impulse of setting again to rest, which, while causing the control card 75 to pass by, leads in front of the appropriate finger 84 the notch 83 which resets the relays controlling the speeds at the dead point.

It has been seen that the control card could have as large a width as desired. This permits that it may control other operations than those explained above, because, for each supplementary operation, it is sufficient to provide an additional row of notches 83 and appropriately to arrange the exploring device.

In this way, it is possible to control by the control card the reversing operations of the projectors during the projection of the film in the motion-picture projection installations having at least two projection devices which are to be used alternately during the projection. For instance, it is sufficient for this purpose to provide relays capable first of causing the preparatory operations (starting the motor of the device which is to be set in motion, lighting its source of light A, etc.), then releasing the inversion (masking one of the projection apparatus, demasking the other, extinguishing the source of light A of the device which has just been masked, etc.).

Among the other operations capable of being effected by the control card, may be mentioned: control of the sound level, control of a stereophonic system by throwing the sound on the one or other group of loudspeakers, etc.

Figure 7:
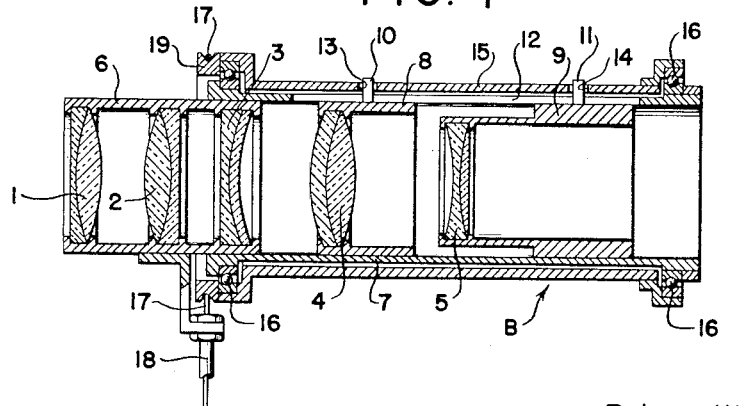
Fig. 7 is a longitudinal sectional view of an objective of variable focus, according to the invention.

It is believed that the description of the relays given above is sufficient for any technician to set them up. For this reason, it has not been considered necessary to show in detail the electrical layout of the installation, either with respect to the variations in the dimensions of the pictures and the screen, or with respect to the inversion of the projection apparatus and other operations. However, an example of a part of an electrical layout is shown in Fig. 8 in connection with a variable objective as shown in Fig. 7. The variable objective B illustrated in Fig. 7 is the same as that shown and described in the pending application and comprises lenses 1 and 2, which form an ordinary objective, and the lens 3, fixed in a mounting 6, in the spaced relation shown, the mounting 6 itself is attached to a cylindrical tube 7. The objective also includes lenses 4 and 5 attached respectively in mountings 8 and 9 and said mountings are slidingly and rotatively located in the tube 7. The mountings 8 and 9 are so arranged that the part of the mounting 9 carrying the lens 5 is capable of fitting into mounting 8 and thus to permit the lenses 4 and 5 to be in contact with one another. The mountings 8 and 9 are equipped with lugs 10 and 11, respectively, which extend through a longitudinal slot 12 in tube 7, and terminate, respectively, in helicoidal guide slots 13 and 14 provided in an outer tube 15 coaxial to the tube 7 and capable of rotation without being displaced longitudinally with respect to the latter. Ball thrust bearings 16 are placed between the two tubes 7 and 15 at the ends. The tube 15 is turned or rotated around the tube 7, for example, by means of a metal cable or push-pull wire 17 extending through protective tubes 18 and around a drum 19 which is fixed to and forms a unit with the tube 15, the cable or wire 17 being attached at a point to the drum 19 for avoiding any slipping when the cable 17 is driven in the manner shown in Fig. 8.

An objective B with variable focus, such as described above and shown in Fig. 7, permits the dimensions of the image on the screen to be varied greatly. By way of example, consider the case where the objective is formed by an ordinary classical objective by the lenses 1 and 2 having a focal distance of the order of 100 mm., for instance, and by the afocal system of lenses 3, 4 and 5 which have the following respective focal lengths: $f_3=+150$ mm., $f_4=-100$ mm., and $f_5=+150$ mm.

The lens 4 may be displaced between two positions as limits, as follows:

In contact with the fixed lens 3 where, from a consideration of the focal lengths of the lenses of the optical system it will be found that the enlargement is ½; and In contact with the movable lens 5 where, from a similar consideration of the focal lengths of the lenses involved it will be found that the enlargement is 2.

The dimensions of the picture projected may thus be varied in the relation of 1 to 4, which is more than sufficient for the requirements in practice.

Where the installation includes two projection groups or projectors, as is generally the case in projection rooms, there is mounted on each projector an objective B similar to that shown in Fig. 7 and described above, the two objectives being subjected to the same control. In this manner, at the moment of connecting one reel to another, there is no discontinuity in the dimensions of the picture. For this purpose, if the two projectors have their objectives B respond to the rotation of drums 19 and 19', respectively (Fig. 8), in the manner described for the drum 19 and a single projector, which rotation is obtained by means of cables 17 and 17' operating in sheaths 18 and 18', respectively, it is only necessary to pass said cables over similar control drums 30a and 30b, respectively, fixed to the same shaft 31 driven by the motor M1 on a shaft 36 (Fig. 8) through a reducing worm gear 32 fixed on shaft 36 and a toothed wheel 33 fixed to shaft 31.

In the general situation where there are two projectors or projection groups, each having a pilot band moving and sensing mechanism, the exciter circuit for the relays which control the motors may be branched in parallel for operation, respectively, by the synchronously operated band for each projector, a sufficient number of switches of the types 86 or 88 being provided for each with operable contacts for effecting the various operations in the manner described above.

Fig. 8 shows by way of example one mode of possible realization of the control relays, illustrated in connection with the motors M1 and M3. The forward or picture increase contact 88a is connected by wires 34 and 35 in the feeding and operating circuit of a relay 54 through a source of low-tension current, such as a battery 55, said relay 54 being capable of closing three bridging contacts 56 of the three-wire exciter circuit 91 of the motors M1 and M3, to supply operating current from supply wires 39 connected into five switches of the similar relays 54 and 57. The reverse or picture reducing contact 88b is connected by wires 37 and 35 in the feeding and operating circuit of the relay 57 through the source of current 55, said relay 57 being capable of closing three bridging contacts 58 of the exciter circuit 93 for reversing the motors M1 and M3. The wires 91 and 93 are connected into the wires 40 of the motors M1 and M3 in such a manner that the motors rotate forward when current flows through wires 91 and the reverse when current is supplied through wires 93.

When contact 88a is closed as finger 84 is raised, current flows from source 55 through a wire 38, a wire 41 and the closed, normally open switch of relay 70 therein, wire 35 to the closed contact 88a, spring strip 85 and wire 34 to the operating coil of relay 54, a wire 42, bridging contacts 65 and a wire 43 to the other side of the current source 55. In a similar manner the closing of the contact 88b causes current to flow from the source 55, through wires 38, 41 and 35, the closed contact 88b, spring strip 85, wire 37 to the operating coil of relay 57, a wire 45, bridging contacts 64 and a wire 46 to the other side of the current source 55.

The relays 54 and 57 include maintenance bridging contacts 59 and 60, respectively, parallel to the control contacts 88a and 88b, and in series, respectively, with corresponding normally closed track-limit switches 61 and 62, actuated to open position for instance, by a finger 63 projecting from a disc or drum 63' attached to the shaft 31. For example, the contact of switch 61, which corresponds to the largest picture dimension, is in series with the armature bridging contacts 59 of the relay 54 which controls the picture increase and screen width increase, and the contact of switch 62 is in series with the armature bridging contacts 60 of the relay 57 which controls the picture decrease and screen width decrease.

When the relay 54 is operated it is held by current from source 55 flowing through wires 38, 41, 35, closed bridging contacts 59, a wire 48 containing the switch 61, wire 34 to the operating coil of relay 54, wire 42, bridging contacts 65 and wire 43. The relay 57, when operated is held in a similar manner by current flowing from wire 35 through the closed bridging contacts 60, a wire 49 containing the switch 62, wire 37 to the operating coil of relay 57, wire 45, bridging contacts 64 and wire 46 to the current source 55.

The relays 54 and 57 have the normally closed interrupting bridging contacts 64 and 65, respectively, which are in series with the operating coil of the other relay so that, if one relay is operated, the other is non-operative. The relays 54 and 57 each carry a pair of normally open bridging contacts 66 and 67, respectively, capable of feeding current from the neutral (N) and one side of wires 39 through pairs of wires 51 and 52, respectively, to the operating coil 68 of an electric brake shoe 69 acting on a brake drum 92 fixed to the shaft 36 for releasing this brake as soon as the motors M1 and M3 are fed with current. When the current is cut to the motors it is also cut to the coil 68 and the brake 69 energetically brakes the drum 92 and stops the shaft 36 and the entire system operated thereby. A similar brake operated in parallel is used on shaft 28' to stop the motor M3, but is not shown to avoid extending the drawing.

The stopping contact 86 in Fig. 8 acts on the relay 70 for stopping motors $M_1$ and $M_3$. The relay 70 controls the bridging contacts of the closed biased to open switch in wire 41, connected in series in the exciter circuits of the relays 54 and 57 so as to cut the feeding circuit of these relays when finger 84 is lifted and the contact 86 is opened, cutting off the flow of holding current from source 55 through wire 38, spring strip 85, the switch 86 when closed, wire 53 to the operating coil of the relay 70 and a wire 90 to the other side of the source 55. Manual operation may be obtained by providing switches parallel to switches 86, 88a and 88b.

In order to simplify the showing in Fig. 8 the same forward and reverse relays 54 and 57 have been described in connection with the operation of the motors $M_1$ and $M_3$ simultaneously in forward and reverse directions, respectively. A similar set of relays might be provided for the motor $M_2$, since it is operated independently of the motor $M_3$, as shown in Fig. 1. For example, in the illustrative operation described above, all three motors $M_1$, $M_2$ and $M_3$ are started at the same time to increase the dimensions of the picture and of the picture area of the screen, where it is desired to maintain the same relative dimensions. However, at a certain point it is desirable to stop the motor $M_2$ and continue the operation of the motors $M_1$ and $M_3$, until the dimensions of the picture and that of the screen controlled by the motor $M_3$ increase to their maximum values. While the motors $M_1$ and $M_3$ are shown in Fig. 8 as operated simultaneously by the same control relays and switches 86, 88a and 88b, it is to be understood that separate switches and independent relay systems will be provided for each of the motors in order to obtain some of the effects and results in connection with Figs. 3 and 4.

With reference to Fig. 8, of the drawings and assuming that the projector is in operation, and that the control card or strip 75 is moved so that notches 83 are brought in front of fingers 84 to cause the operation of the motors $M_1$, $M_2$, and $M_3$ to increase the dimensions of the pictures. This operation is illustrated in Fig. 8 when the finger 84 is lifted and the contact 88a is closed for a short period of time and energizes the relay 54 which corresponds to the increase in the dimensions of the picture and of the width of the screen. At the same time a corresponding contact 88 for the motor $M_2$ is actuated so that all three motors $M_1$, $M_2$ and $M_3$ are energized. Referring again to Fig. 8, it will be noted that the relay 54 is held energized by the armature bridging contacts 59. The motor $M_1$ operates the variable objective B through the gearing 32 and 33, the shaft 31, the drum 30a and the drum 19 of the objective B. The objective B' of a second projector will also be operated by the drum 30b. The motor $M_3$ actuates the gearing 28b and 29b, the shaft 27 and the drum 26 to in turn actuate the width masks to enlarge the width of the picture area of the screen. The motors $M_1$ and $M_2$ will continue to operate until the switch 86 is opened or until the switch 61 is opened.

When the finger 84 for the switch 88b is lifted and the contact closed, the relay 57 is operated to supply a current from the supply wires 39 to the motors $M_1$ and $M_3$ via connections which are different from those made when the relay 54 is closed, so that the motors are operated in the reverse direction until the relay 57 is de-energized by the opening of the switch 62 or the motors may be stopped at any point by the pilot strip R and card 75 when the latter contains an opening 83 permitting the finger 84 to allow the opening of the switch 86. The current supply 39 may be either three line or two line supply. In the present instance, as shown in Fig. 8, the middle wire is neutral so that while the motors $M_1$ and $M_2$ may be supplied with 220 volt current, the brake relay 68 is supplied with 110 volt current.

As it is natural, and as it results already from what precedes, the invention is by no means limited to that of its modes of application, or to those of the modes of realization of its different parts which have been more specially explained; it embraces, on the contrary, all variants, especially that in which the intermittent displacements of the control card are caused upon the intervention of the operator rather than automatically during the projection.

What I claim is:

1. In a picture-projecting system for the projection of motion pictures including a projector for projecting pictures from a film onto the picture area of a screen, and a screen onto which the pictures are projected, means providing a border of variable inside dimensions surrounding and defining the picture area of the screen, means acting on said border-providing means for changing the effective inside dimensions of the border, means for changing the dimensions and area of the pictures projected onto the screen by the projector, a control strip provided with signal-producing means indicative of predetermined changes to be made respectively in the inside dimensions of the border and in the dimensions of the pictures projected onto the screen, electrically-actuated means responsive to the operation of the projector for displacing the control strip to bring signal-producing means thereof into operative position, means cooperating with the signal-producing means of the control strip for producing signals corresponding to the signal-producing means brought into operative position, and signal-receiving means responsive to the resulting signals for respectively effecting the actuation of the means acting on the border-providing means and the actuation of the means for changing the dimensions of the pictures projected onto the screen.

2. A picture-projecting system for the projection of motion pictures as claimed in claim 1, in which the means for displacing the control strip includes a signal-carrying means movable in response to the operation of the projector, said electrically-actuated means being responsive to the signals of the signal-carrying means for displacing the control strip.

3. A picture-projecting system for the projection of motion pictures as claimed in claim 2, in which the means responsive to the signals of the signal-carrying means includes electrically operable means for intermittently displacing the control strip to bring signal-producing means thereof into operative position.

4. A picture-projecting system for the projection of motion pictures as claimed in claim 1, in which the means providing a border comprises border masks movable parallel to the edges of the screen, and in which the means acting on the border-providing means includes means for changing the relative inside height-to-width dimensions of the picture area of the screen.

5. A picture-projecting system as claimed in claim 1, in which the means responsive to the signals produced by the control strip includes a switch for each of the respective signals indicative of the different predetermined changes to be made, and electrical means responsive to the operation of each switch for effecting a predetermined operation.

6. A picture-projecting system as claimed in claim 1, in which the control strip includes a plurality of rows of slots as signal-producing means extending lengthwise of the control strip, an electric switch for each row of slots, and a finger associated with said switch adapted to enter a slot in said row when the control strip is moved to a position in which the slot is in register with the finger.

7. A picture-projecting system for the projection of motion pictures as claimed in claim 1, characterized in that the border-providing means includes top, bottom and side masking units respectively displaceable parallel to the edges of the screen, the border-changing means including means for acting independently respectively on the top and bottom masking units together and on the side units together for changing the effective inside dimensions and the relative height-to-width of the inside dimensions of the border-providing means.

8. A picture-projecting system for the projection of motion pictures as claimed in claim 1, characterized in that the control strip includes separate parallel longitudinally-extending rows of signal-producing means respectively for the increase and decrease and for stopping either the increase or decrease respectively in the dimensions of the pictures projected onto the screen and in the inside dimensions of the border-providing means.

9. A picture-projecting system for the projection of motion pictures as claimed in claim 1, characterized by including signal-producing means brought into operation by and during the operation of the projector and adapted to give a signal for initiating the displacement of the control strip by the electrically-operated means.

10. In a picture projecting system for the projection of motion pictures, including a projector for projecting pictures from a film onto the picture area of a screen and a screen onto which the pictures are projected, a border-forming means of variable inside dimensions surrounding and defining the picture area of the screen, means acting on said border-forming means for changing the effective inside dimensions thereof, means for changing the dimensions of the pictures projected onto the screen by the projector, a displaceable control strip provided with signal-producing means indicative of predetermined changes to be made respectively in the inside dimensions of the border-forming means and in the dimensions of the pictures projected onto the screen during the course of projection of the motion picture film, a second signal-producing means brought into operation by the projector during the projection of the motion pictures and adapted to give a signal for initiating the displacement of the control strip, means responsive to the signals produced by said second signal-producing means for displacing the control strip to bring signal-producing means thereof into operative position, means cooperating with the signal-producing means of the control strip for producing signals corresponding to the signal-producing means of the control strip brought into operative position, and signal-receiving means responsive to the signals produced by the signal-producing means of the control strip for respectively effecting the actuation of the means acting on the border-forming means and the actuation of the means for changing the dimensions of the pictures projected onto the screen.

References Cited in the file of this patent

UNITED STATES PATENTS

| | | |
|---|---|---|
| 1,218,979 | Cahill | Mar. 13, 1917 |
| 1,268,472 | Kellum | June 4, 1918 |
| 1,271,929 | Nelson | July 9, 1918 |
| 1,646,855 | Del Riccio | Oct. 25, 1927 |
| 2,042,815 | White | June 2, 1936 |
| 2,136,209 | Finch | Nov. 8, 1938 |
| 2,165,341 | Capstaff et al. | July 11, 1939 |
| 2,204,709 | Straubel et al. | June 18, 1940 |
| 2,475,439 | Waller et al. | July 5, 1949 |
| 2,517,246 | Seitz et al. | Aug. 1, 1950 |
| 2,558,660 | Mullen | June 26, 1951 |
| 2,563,892 | Waller et al. | Aug. 14, 1951 |
| 2,606,476 | Waller et al. | Aug. 12, 1952 |

FOREIGN PATENTS

| | | |
|---|---|---|
| 698,912 | France | Nov. 29, 1930 |